J. R. ROGERS.
Broadcast-Seeder.
No. 1,057. Reissued Oct. 9, 1860.
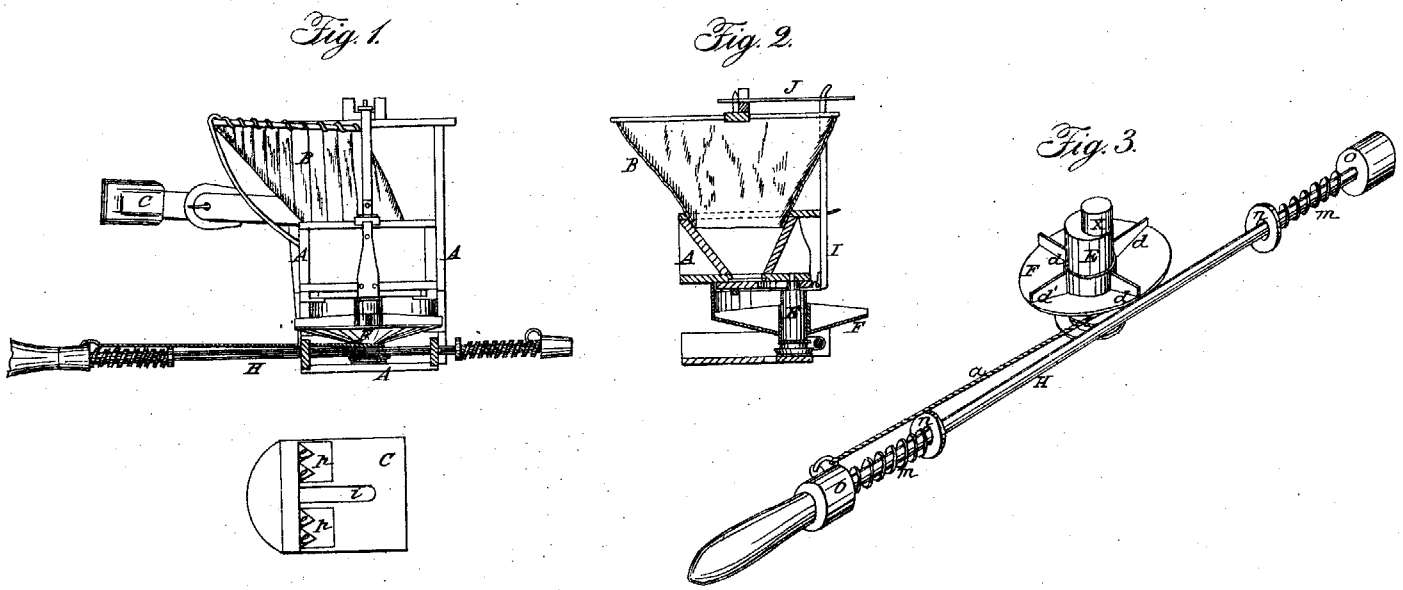
Witnesses:
C M Alexander
A H Yeatman
Inventor:
Jno R Rogers
AM. PHOTO-LITHO. CO. N.Y. (OSBORNE'S PROCESS.)

UNITED STATES PATENT OFFICE.

JOHN R. ROGERS, OF SACRAMENTO, WISCONSIN.

IMPROVEMENT IN PERCUSSION-SEEDERS.

Specification forming part of Letters Patent No. 27,385, dated March 6, 1860; Reissue No. 1,057, dated October 9, 1860.

*To all whom it may concern:*

Be it known that I, JOHN R. ROGERS, of Sacramento, in the county of Green Lake and State of Wisconsin, have invented certain new and useful Improvements in Percussion-Seeders; and I do hereby declare that the following is a full, clear, and exact description of the same, reference being had to the accompanying drawings, and to the letters of reference marked thereon.

The nature of my invention consists in the employment and arrangement of the several parts described, substantially in the manner hereinafter set forth.

In the drawings, Figure 1 represents a side elevation. Fig. 2 represents a section of seed-hopper. Fig. 3 is a detached view of the rod and cord for operating the seeding-wheel. Fig. 4 is a plan view of seed slide and agitator.

In the figures, A represents the frame of the machine, which may be made in any suitable form, so that it is not made too heavy, as the machine is intended for hand use and is carried by the operator.

B represents a flexible hopper made of cloth or leather or other suitable material. The hopper B is secured at its lower end to the frame, while a wire rod passes around it at its upper extremity to hold it in proper shape.

C represents a band or strap by means of which the machine is secured to the body of the operator.

E represents a vertical shaft which is secured in the lower portion of the frame. This shaft passes through and is secured to a wheel, F. The wheel F is made dish-shaped, being deepest at its center, or immediately around the shaft E, which passes through its center. The wheel F is provided with a series of flanges, *d d*, which radiate from its center, terminating at its periphery.

H represents a rod provided with a handle, with a cord, *a*, and surrounded, near each end, with two coiled wire springs, *m m*. The springs *m m* rest at one end against shoulders *o o* on the rod H and at their other end against slide-washers *n n*. The rod H slides in guides in the lower portion of the frame, and the cord *a* winds once around the shaft E, the end of said cord being secured near each end of the rod H.

It will be seen now that when the rod is moved backward and forward by means of the hand of the operator the shaft E, and consequently the wheel F, will have a backward and forward rotary motion. The shaft E being made small where the cord passes around it, the wheel F necessarily has a quick rotation, as the rod is moved briskly, and consequently the percussion is great enough to throw the seed which fall upon it some distance.

*c* represents a seed slide and shaker, which is formed in the manner shown in Fig. 4. It is provided with a slot, *i*, through which the eccentric portion of the shaft E (marked *x*) passes, by means of which it is given a lateral vibration to agitate the seed with its teeth *e e*.

*p p* represent the apertures through which the seed pass to the wheel F. A lever, I, connects to the outer end of this slide *c*, and rod J connects with said lever for the purpose of moving the slide *c* so as to open or close the seed-aperture. In using this machine the seed is placed in the hopper and the machine is secured to the operator by means of the strap C. The operator moves the slide *c* by lever I and rod J, so as to allow a sufficient quantity of grain to fall through upon wheel F, and walking forward gives the rod H a backward and forward motion at each step. The grain falling upon wheel F is thrown off violently and distributed over the ground. The springs *m m* serve to break and give an easy motion to the rod H. The seed may then be distributed regularly and with great rapidity.

The principle of this machine is not centrifugal, but percussion. As the seed fall toward the wheel, they are struck before reaching it by the flanges upon said wheel, and are thus driven off. It is not material to have more than a skeleton wheel—a rim provided with flanges—for the flanges move so rapidly that it is impossible for seed to pass by them without being struck, except when the wheel stops to reverse. At that time a few seed may fall through to the ground, but not enough to do any damage.

Having thus fully described my invention, what I claim as new, and desire to secure by Letters Patent, is—

1. The employment of the horizontal wheel F, provided with tapering flanges, when said wheel has a backward and forward rotary motion imparted to it for the purpose of seeding by percussion, and for lapping the grain substantially as specified.

2. The seed shaker and regulator *c*, in combination with the eccentric shaft E, when the same are used as and for the purpose specified.

3. The use of the rod H and cord *a*, in combination with the shaft E and the flanged wheel F, substantially as and for the purpose herein specified.

J. R. ROGERS.

Witnesses:
O. F. SILVER,
EZRA WHEELER.